US006586084B1

(12) United States Patent
Paschke et al.

(10) Patent No.: US 6,586,084 B1
(45) Date of Patent: Jul. 1, 2003

(54) COMPOSITE MATERIAL JIB

(75) Inventors: Franz Paschke, Sande (DE); Kurt Vohdin, Zetel (DE)

(73) Assignee: Grove U.S. LLC, Shady Grove, PA (US)

( * ) Notice: Subject to any disclaimer, the term of this patent is extended or adjusted under 35 U.S.C. 154(b) by 0 days.

(21) Appl. No.: 09/347,509

(22) Filed: Jul. 2, 1999

(30) Foreign Application Priority Data

Jul. 3, 1998 (DE) ........................................ 198 29 829

(51) Int. Cl.[7] ................................................ B32B 15/14

(52) U.S. Cl. ................................ 428/298.1; 428/301.1; 442/232; 442/378; 212/348; 52/111; 52/118

(58) Field of Search ........................... 428/298.1, 301.1; 442/232, 378; 212/348; 52/111, 118

(56) References Cited

U.S. PATENT DOCUMENTS

| | | | |
|---|---|---|---|
| 4,027,448 | A | 6/1977 | Tymciurak |
| 4,163,630 | A | 8/1979 | Weiland |
| 4,248,062 | A | 2/1981 | McLain et al. |
| 4,289,557 | A | 9/1981 | Stanwood et al. |
| 4,408,380 | A | 10/1983 | Schaper et al. |
| 4,565,595 | A | 1/1986 | Whitener |
| 4,613,870 | A | 9/1986 | Stonier |
| 4,851,065 | A | 7/1989 | Curtz |
| 5,035,094 | A | 7/1991 | Legare |
| 5,048,441 | A | 9/1991 | Quigley |
| 5,052,645 | A | 10/1991 | Hixon |
| 5,207,848 | A | 5/1993 | Mahoney et al. |
| 5,238,716 | A | 8/1993 | Adachi |
| 5,242,720 | A | 9/1993 | Blake |
| 5,266,021 | A | 11/1993 | Jacobson |
| 5,333,422 | A | 8/1994 | Warren et al. |
| 5,348,603 | A | 9/1994 | Yorgason |
| 5,382,131 | A | 1/1995 | Werthmann |
| 5,549,772 | A | 8/1996 | Harris et al. |
| 5,731,987 | A | 3/1998 | Strong et al. |
| 5,822,838 | A | 10/1998 | Seal et al. |

FOREIGN PATENT DOCUMENTS

| | | | |
|---|---|---|---|
| DE | A1 3228314 | | 2/1984 |
| EP | A1 0117774 | | 9/1984 |
| GB | 2265200 | * | 9/1993 |

* cited by examiner

*Primary Examiner*—Elizabeth M. Cole
(74) *Attorney, Agent, or Firm*—Birch, Stewart, Kolasch & Birch, LLP

(57) ABSTRACT

At least one section of a jib of a crane, such as a mobile crane, includes a composite cross-section incorporating a layer of steel covered by one or more fiber composite layers. In a preferred embodiment, more than one fiber composite layer is included and the respective fiber layers are disposed in a criss-cross manner with respect to each other to enhance the overall strength of the telescopic part. Also, in a preferred embodiment the steel layer of the composite is on the interior of the telescopic part for minimizing thermal stresses due to temperature changes caused by sun loads. In another preferred embodiment, the composite fiber layers are disposed only in the zone of the cross-section of the telescopic part, which is subjected to tensile forces during use.

18 Claims, 6 Drawing Sheets

Fig.3
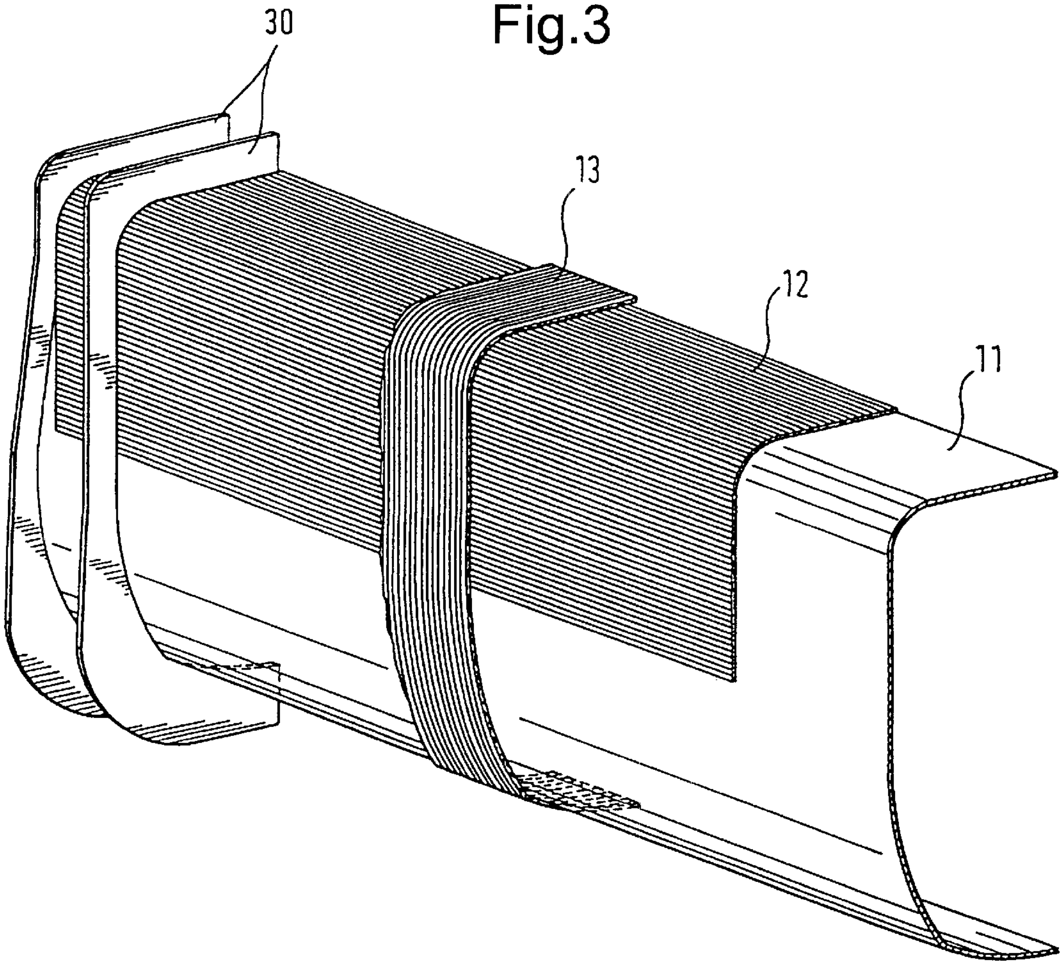
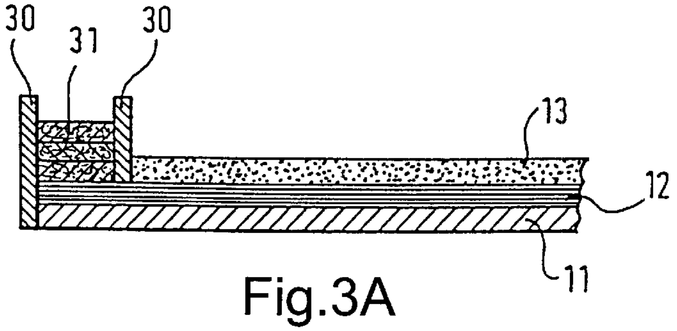
Fig.3A

COMPOSITE MATERIAL JIB

BACKGROUND OF THE INVENTION

The present invention relates to a telescopic part, more particularly, for the jib of a crane or mobile crane, having a closed cross-section of composite materials. More specifically, the present invention relates to a telescopic jib for a crane or a mobile crane, including an articulately jointed base section and at least one telescopic section formed from the composite material.

Telescopic jibs, as employed for instance on stationary or mobile cranes, are configured of several nesting telescopic sections which can be extended to elongate the jib. Each telescopic section is mounted to slide on the other. One factor salient to the loading capacity of the individual sections is the consistently straight cross-section of the telescopic parts.

This dimensional fidelity is ensured by the material properties of the telescopic parts and, on the other hand, by end frames which are required to exhibit a corresponding stiffness, and to serve to introduce the forces into the individual telescopic sections. These end frames are generally termed collars.

Conventional optimized jib cross-sections are fabricated usually of high-strength, weldable, fine-grain steels. The dead weight of the jib, which is relatively high in the case of steel designs, plays a significant role since, on a long reach, most of the loading capacity of the cross-section has already been used up in carrying the dead weight. This is why steel telescopic parts are basically too heavy, but are used typically in prior art due to the high strength of steel.

Known from EP 0 117 774A1 is a telescopic jib comprising telescopic parts featuring a core of expanded polyurethane covered by a skin of a composite material or of aluminum. However, despite its stability being relatively good due to the structure involved, such a sandwich design has inadequate strength for long telescopic jibs in heavy loading situations.

SUMMARY OF THE INVENTION

The object of the present invention is to provide telescopic parts/jibs optimized in weight and strength.

This object is achieved in accordance with the invention by the telescopic part comprising a composite cross-section of a layer of steel and at least one layer of a fiber composite.

In accordance with the invention part of the fine-grain steel cross-section conventionally employed is thus replaced by a fiber composite layer exhibiting, for the same strength and stiffness, a significantly reduced specific weight. The ratio of the loading capacity to the dead weight becomes all the more favorable, the higher the modulus of elasticity of the composite.

A further advantage afforded by the telescopic part in accordance with the invention is rooted in the fact that jib oscillations are reduced. Fine-grain steel jibs have such low natural frequencies that resonance may be prompted simply. by operation or by the wind. Due to the better damping performance of the fiber composite layer employed in accordance with the invention such resonance can be suppressed and the jib quickly comes to rest, it being not possible in general for oscillations to be generated as long as the layers are sufficiently thick.

Yet a further advantage afforded by the telescopic parts and jibs in accordance with the invention is the low deformation due to heating up when exposed on one side to sunlight, which results in undesirable high deformations in the case of steel telescopic parts which, in turn, diminishes the loading capacity.

When, in accordance with one preferred embodiment of the present invention, the steel layer forms an inner layer and the fiber composite layer forms an outer layer of the composite cross-section, the steel core of the telescopic part or jib is no longer exposed to direct sunlight, thus minimizing the differences in temperature and the resulting differences in thermal expansion in the steel. Due to the low conduction of heat and the property that plastics tend to shrink, whilst metals tend to elongate when exposed to heat, it is to be anticipated that such jibs in accordance with the invention remain substantially straighter when exposed on one side to sunlight.

Since the telescopic jib in accordance with the invention can be designed lighter for the same loading capacity, fewer counterweights are needed to compensate the moments acting in the ball bearing slewing ring of a telescopic crane.

In one preferred embodiment of the invention, the fiber composite layer comprises a first fiber composite located preferably inwardly and adjoining the steel layer, this first fiber composite featuring mainly unidirectional fibers in the longitudinal direction of the telescopic part as well as a second fiber composite located preferably outwardly and over the first layer, again featuring mainly unidirectional fibers but oriented transversely to the first layer. In this arrangement, the first and/or the second unidirectional fiber composite may be configured of unidirectional fiber mats.

In such a sandwich arrangement of the fiber composite, a mutually supported and more particularly clamping action of the first unidirectional fiber composite can be achieved by the second unidirectional fiber composite, prohibiting any pull-out of the longitudinal fibers since the transverse fibers become skew and expand, thereby, increasing the contact pressure on the first fiber composite. The longitudinal arrangement of the fibers in the first unidirectional fiber composite generates a particularly flexurally rigid structure since the fibers are expanded only in their longitudinal direction and do not need to be first pulled straight.

The first and/or second fiber composite may comprise longitudinal bundles of fibers in accordance with the invention.

Hitherto, such fiber materials optimized in weight and stability have failed to find application in engineering telescopic parts and jibs for cranes due to there being no possibility known of securing these fiber composites to the jib.

In accordance with the invention, the first fiber composite is applied and locked non-shiftingly in place to the steel layer. This can be achieved basically by one or more of the following securing options:

There is firstly the possibility of positively connecting the first fiber composite to the steel layer, i.e. preferably by extensions protruding from the steel layer engaged by the fiber composite and/or by recesses formed in the steel layer in which the fiber composite mates.

Another possibility consists of securing the first fiber composite to at least a one end of the telescopic part, more particularly to a collar, i.e. preferably by potting and/or by forming a unit securing the collar and the second fiber composite. Nested telescopic jibs have portions at the ends of the individual telescopic sections in which the flexural stresses become zero. It is in these portions in which the collars are likewise located that anchoring the fiber composite material to the steel part can be done to advantage.

There is additionally the possibility in accordance with a further securing aspect in accordance with the invention of maintaining the first fiber composite in place by the clamping action of the second fiber composite wrapping thereabove. Any pull-out of the longitudinal fibers from such "wrapped" fiber bundles is rendered impossible since transverse and longitudinal fibers interlock, and thus the higher the pretension in the transverse fiber and the more the pull in the longitudinal fibers, the higher is the compression. The steel part, longitudinal and transverse fibers accordingly form a positive friction connection.

In accordance with a preferred embodiment of the telescopic part in accordance with the invention, the composite cross-section and, more particularly, the first fiber composite is arranged on only part of the closed cross-section and preferably substantially in the zone of tensile loading. The tensile strength of fiber composite materials is substantially higher than their compressive strength so that it may be of advantage to arrange the first fiber composite only in the tensile loaded zone of the cross-section. The thickness of any jib shell employing a composite material is greater than that of a steel cross-section for the same weight. This results in added stability in preventing localized failures such as plate denting and shell rupture.

The second unidirectional fiber composite including fibers oriented transversely to the first composite prevents, on the one hand, side-shifting or peeling of the first fiber composite form the end and, on the other hand, protects the first fiber composite from damage. In accordance with the invention, a further layer of material, more particularly, a protective layer and/or sliding layer, may be preferably applied to the second fiber composite protecting the fibers highly sensitive to transverse compression, whilst providing adequate sliding properties in telescopic extension and retraction and, more particularly, creating optimized conditions regarding exposure to the sun.

A telescopic jib, in accordance with the invention, finding application more particularly on a crane or mobile crane, comprises an articulately jointed base section and at least one telescopic section; and is configured so that at least one of the sections is configured as the telescopic part in accordance with the description and embodiments as discussed above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitative of the present invention and wherein:

FIG. 3 is a perspective semi-section illustrating the laminar structure for a telescopic part including a collar;

FIG. 3A is a cross-sectional view of the collar of FIG. 3;

Referring now to FIG. 1, there is illustrated a telescopic part 10 in a perspective view illustrating the laminar structure exposed. As the innermost basic component, the telescopic part 10 comprises the steel shell 11 surrounded firstly by the first unidirectional fiber composite 12, the fibers of which are oriented in the direction of the longitudinal axis of the telescopic part. The collar is subsequently also identified as longitudinal fiber composite 12, which may also be configured as a fiber mat.

Located over the longitudinal fiber composite 12 is the second unidirectional fiber composite 13 incorporating fibers, i.e. circumferentially, this also being subsequently termed the transverse fiber composite 13, which may be likewise configured as a fiber mat, surrounding the longitudinal fiber composite 12, thus defining the latter on the steel shell 11.

Figures 1, 1A:
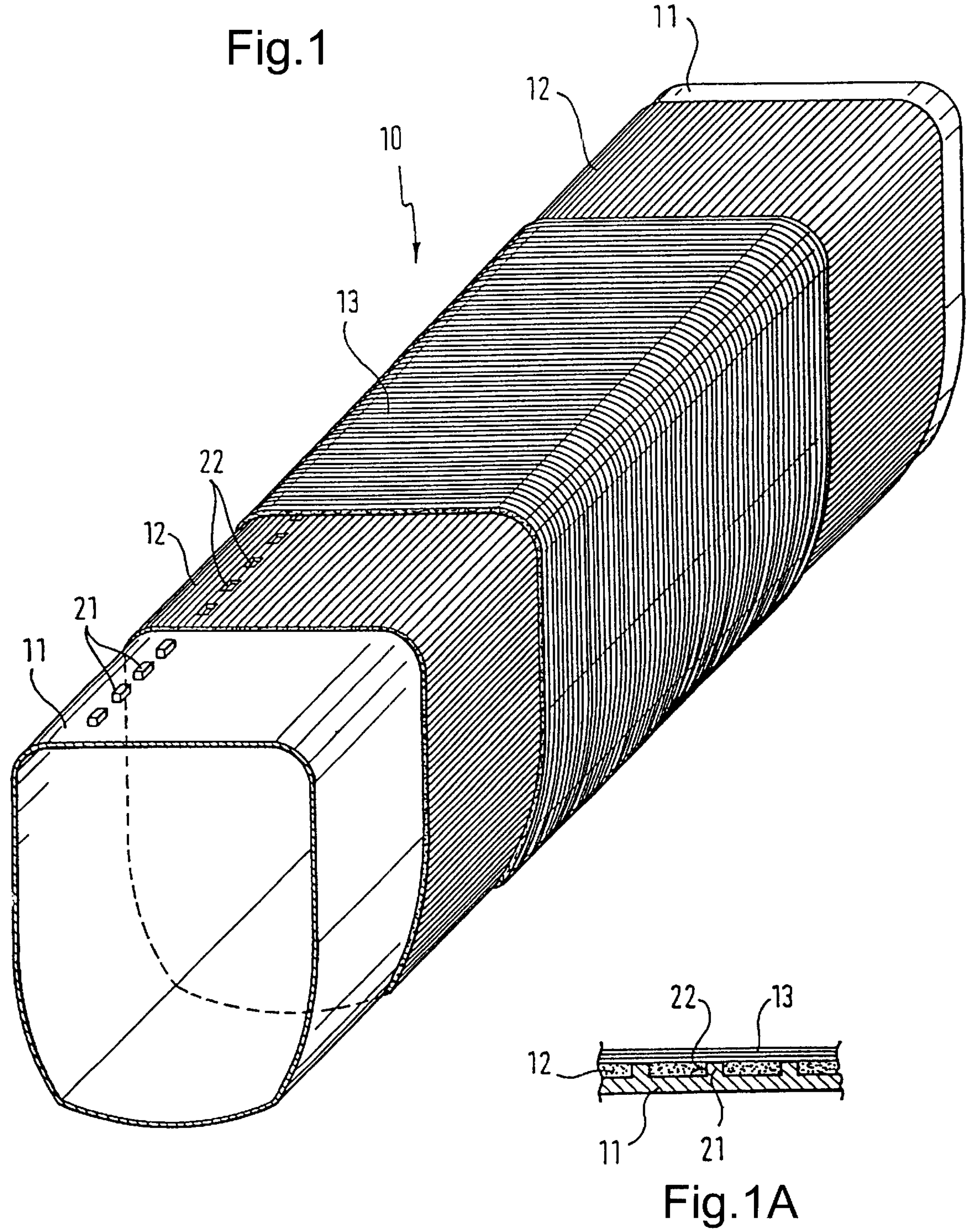
FIG. 1 is a perspective view of the laminar structure of a telescopic part in accordance with the present invention as well as illustrating a first system of securing the first unidirectional fiber composite to the steel layer.
FIG. 1A is a cross-sectional view of the telescopic part of FIG. 1.

To further assist locking the longitudinal fiber composite 12 in place, i.e. to prevent the longitudinal fiber composite 12 from slipping out of place longitudinally on the steel shell 11, a further securing system is provided in the embodiment of FIG. 1. This securing system consists of extensions 21 jutting from the steel shell 11. These extensions are shown in FIG. 1 only in a longitudinal section, but may be distributed over the full circumference. The longitudinal fiber composite 12 comprises recesses 22 into which the extensions 21 engage in the fitted condition.

This securing system is illustrated in FIG. 1A, depicting a cross-section (as viewed in the longitudinal axis of the telescopic part 10) of the upper flat section of the telescopic part 10. It is evident from this sectional view, that the extensions 21 protrude upwards on the steel shell 11 where they are surrounded by the longitudinal fiber composite in the recesses thereof Above the longitudinal fiber composite, the transverse fiber composite 13 closes off the arrangement. Due to the positive connection between longitudinal fiber composite 12 and steel shell 11 via the extensions 21, an arrangement of the longitudinal fiber composite is assured, locked non-shiftingly in place.

Figures 2, 2A:
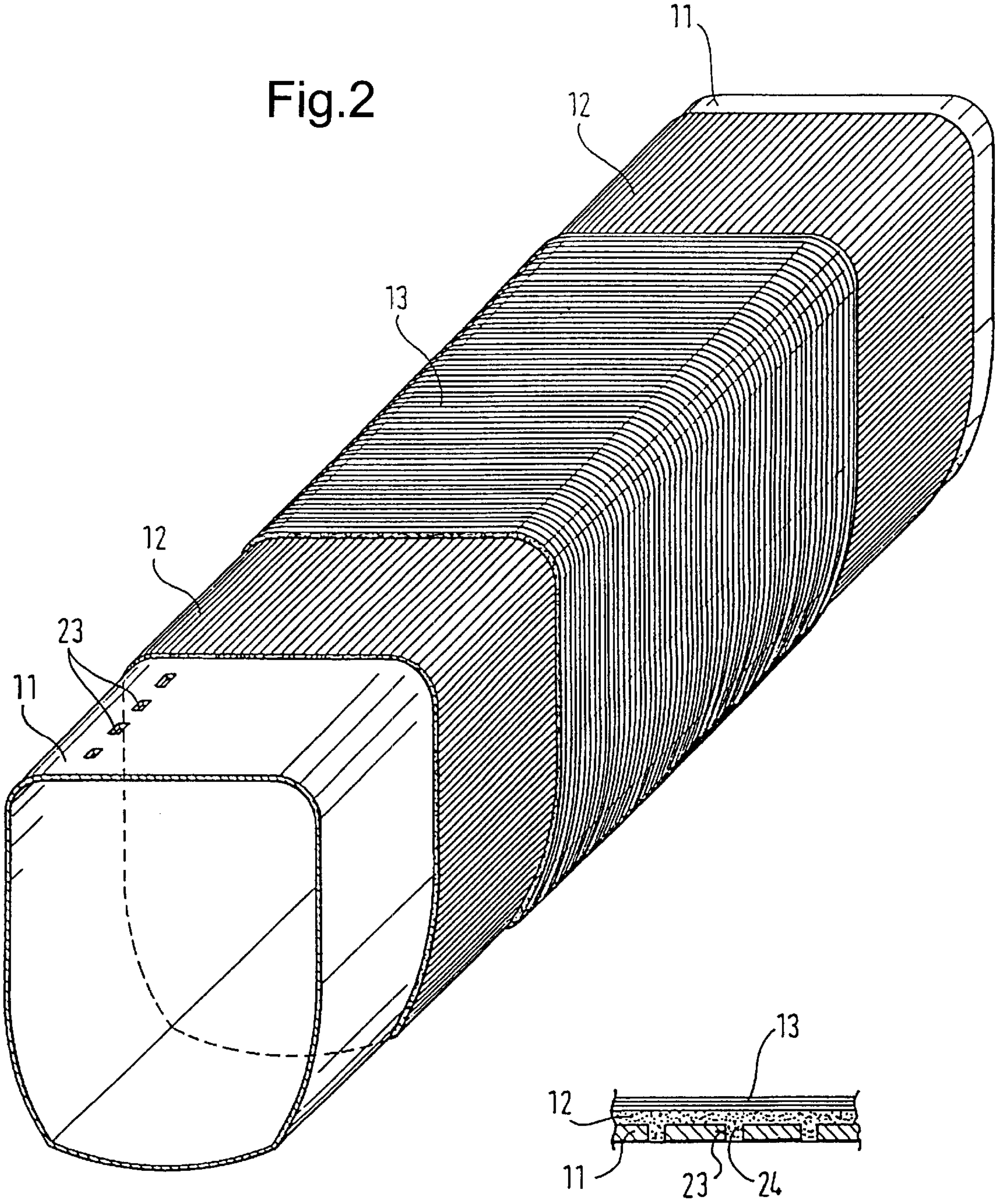
FIG. 2 is a view corresponding to that of FIG. 1 of a telescopic part illustrating a second securing system.
FIG. 2A is a cross-sectional view of the structure of FIG. 2.

Referring now to FIG. 2, there is illustrated a further system for securing the longitudinal fiber composite 12. In this embodiment, the steel shell 11 comprises recesses 23 into which—as evident from the cross-sectional view of FIG. 2A—material protuberances 24 engage, protruding downwards from the longitudinal fiber composite 12. This thus illustrates the inverse condition as shown in FIG. 1, here too, a connection locking the system in place being assured.

Referring now to FIG. 3, there is illustrated a perspective view of a telescopic part in accordance with the invention incorporating steel shell 11, longitudinal fiber composite 12, transverse fiber composite 13 (shown in part) and a steel collar 30. FIG. 3A is a longitudinal section in the region of the collar. The longitudinal fiber composite 12 is illustrated only in the upper portion, i.e. in the tensile loading zone. Securing the longitudinal fiber composite 12 in this embodiment is done by potting the fibers in the collar 30. As evident from the longitudinal section view of FIG. 3A, the collar 30 may also be filled with fiber material 31 for stiffening. Telescopic jibs such as the one as shown in FIG. 3 feature at the collar end a portion in which the reference stresses are small. This is why the arrangement for anchoring the longitudinal fiber composite 12 in the steel collar 30 is simpler in the collar portion.

Figure 4:
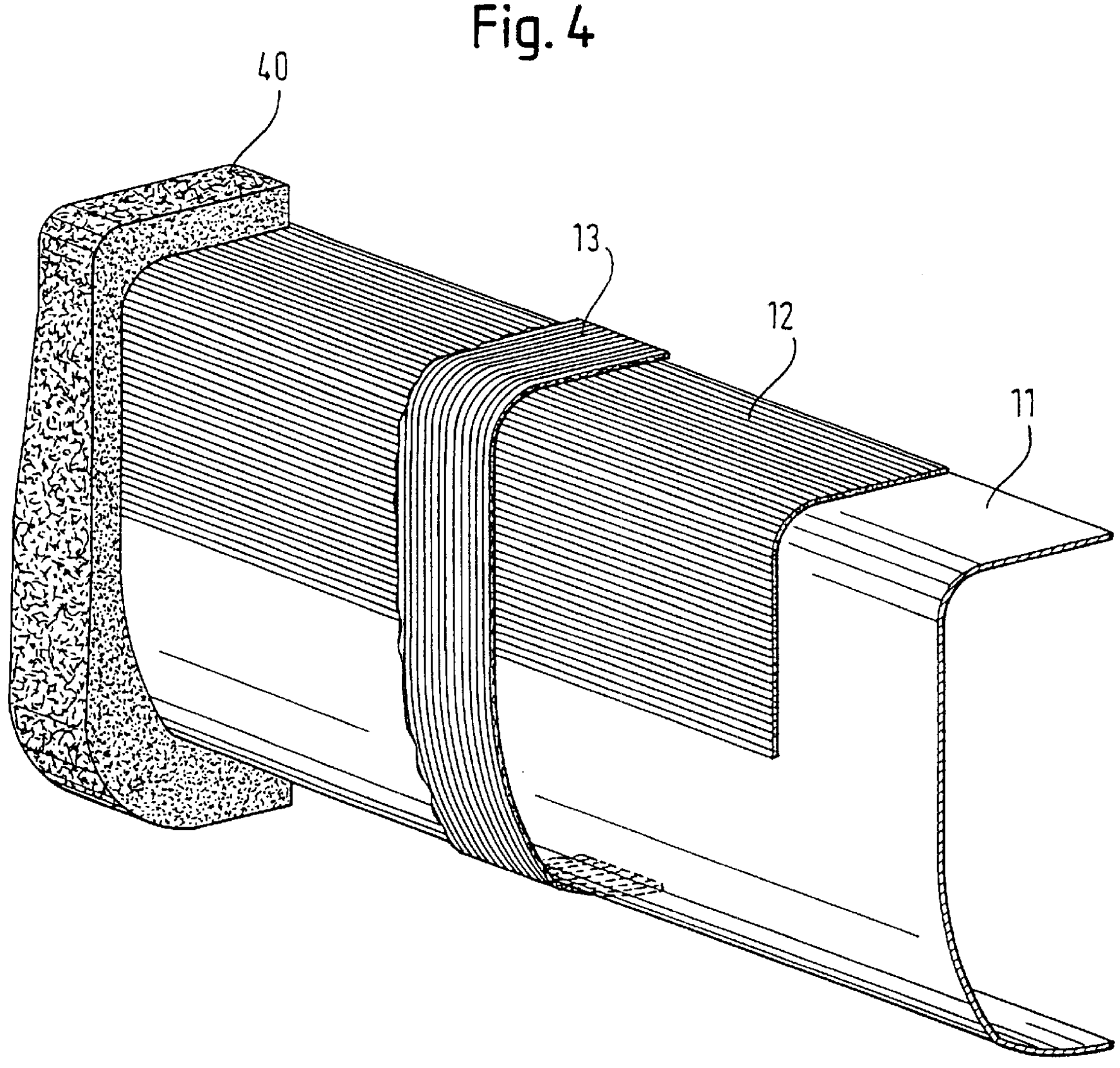
FIG. 4 is a view as shown in FIG. 3 for a telescopic part, including a collar designed as a fiber composite structure.

Referring now to FIG. 4, there is illustrated a telescopic jib incorporating steel shell 11, longitudinal fiber composite 12 and transverse fiber composite 13 in a view corresponding to that as shown above in FIG. 3. In this embodiment as shown in FIG. 4, however, the collar 40 is configured as a fiber composite structure and the ends of the longitudinal fiber composite 12 are woven into this collar 40 as a result of which adequate securing is assured.

In all examples of the securing system as cited above, the transverse fiber composite 13 surrounds the longitudinal fiber composite 12 locking it in place on the steel shell 11 by friction locking alone. The transverse fiber composite 13 serves in addition to prevent peeling of the ends of the longitudinal fiber composite 12.

Figure 5:
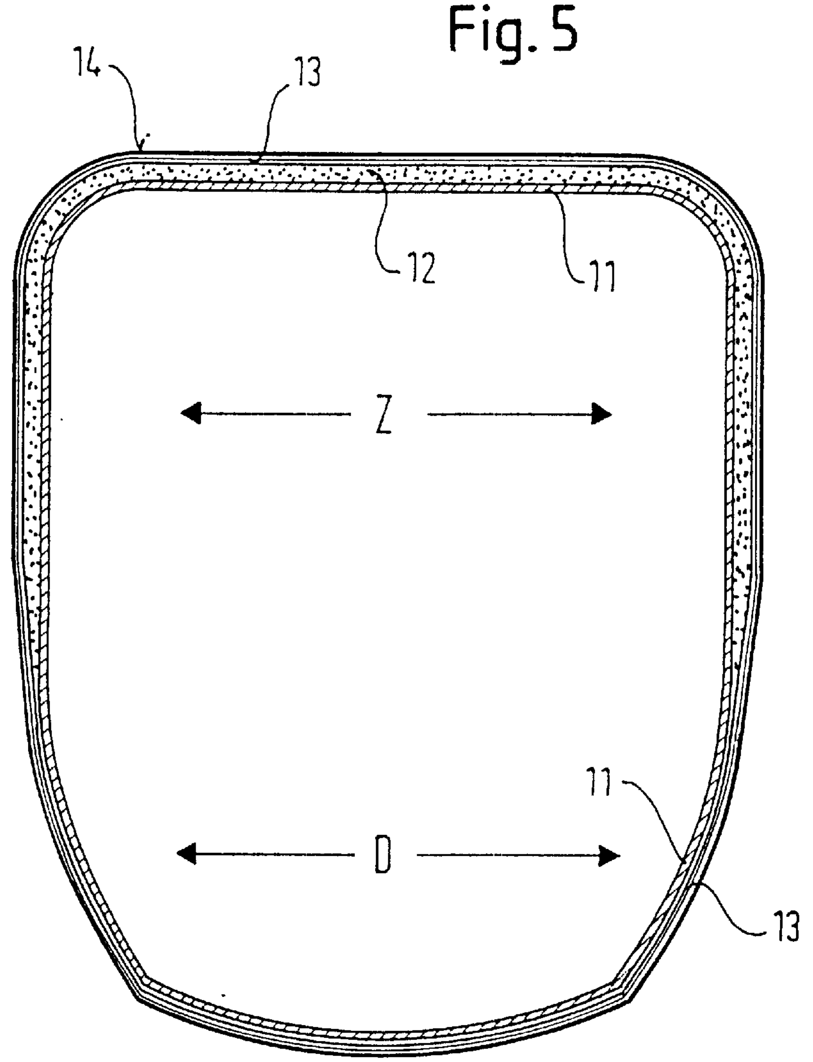
FIG. 5 is a cross-sectional view of a telescopic part in accordance with the invention illustrating a fiber composite layer in the tensile zone; thereof
Figure 6:
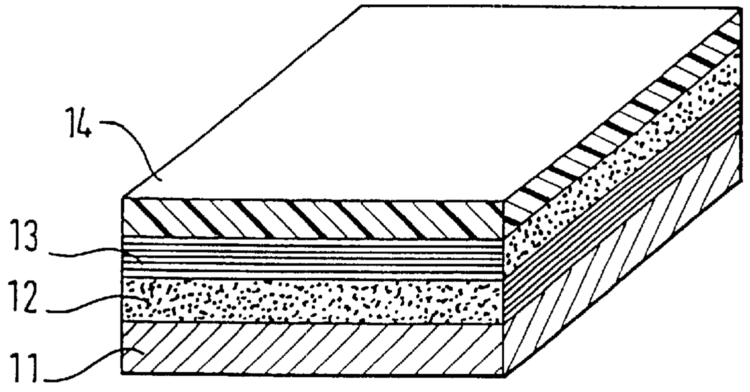
FIG. 6 is an illustration of the laminar structure for a telescopic part in accordance with the invention.

Referring now to FIG. 5, there is illustrated a cross-sectional view of a telescopic part in accordance with the invention in which a longitudinal fiber composite structure is provided only in the tensile zone Z. This structure—reading from the inside outwards—incorporates the steel shell 11, the longitudinal fiber composite 12, the transverse fiber composite 13 and a sliding or protective layer 14 covering the transverse fiber composite 13; this structure again being evident sectionwise in FIG. 6.

The telescopic part as shown in FIG. 5 comprises in the compression zone D no longitudinal fiber composite 12. The compressive strength of fibers in the longitudinal fiber direction is substantially less than their tensile strength. This is why it may be of advantage to eliminate the longitudinal fiber composite in the zone subjected to compressive stress as in the embodiment as shown in FIG. 5. To ensure that the longitudinal fiber composite is locked in place, the transverse fiber composite 13 surrounds the full cross-sectional circumference, however.

The protective or sliding layer 14 protects, on the one hand, the transverse fiber composite 13 from damage, since it is highly sensitive to transverse compression, whilst permitting, on the other, satisfactory sliding of the corresponding telescopic parts when disposed nested in a jib. In addition, the layer 14 may be further configured so that it counteracts the detrimental effects of exposure to sunlight.

Figure 7:
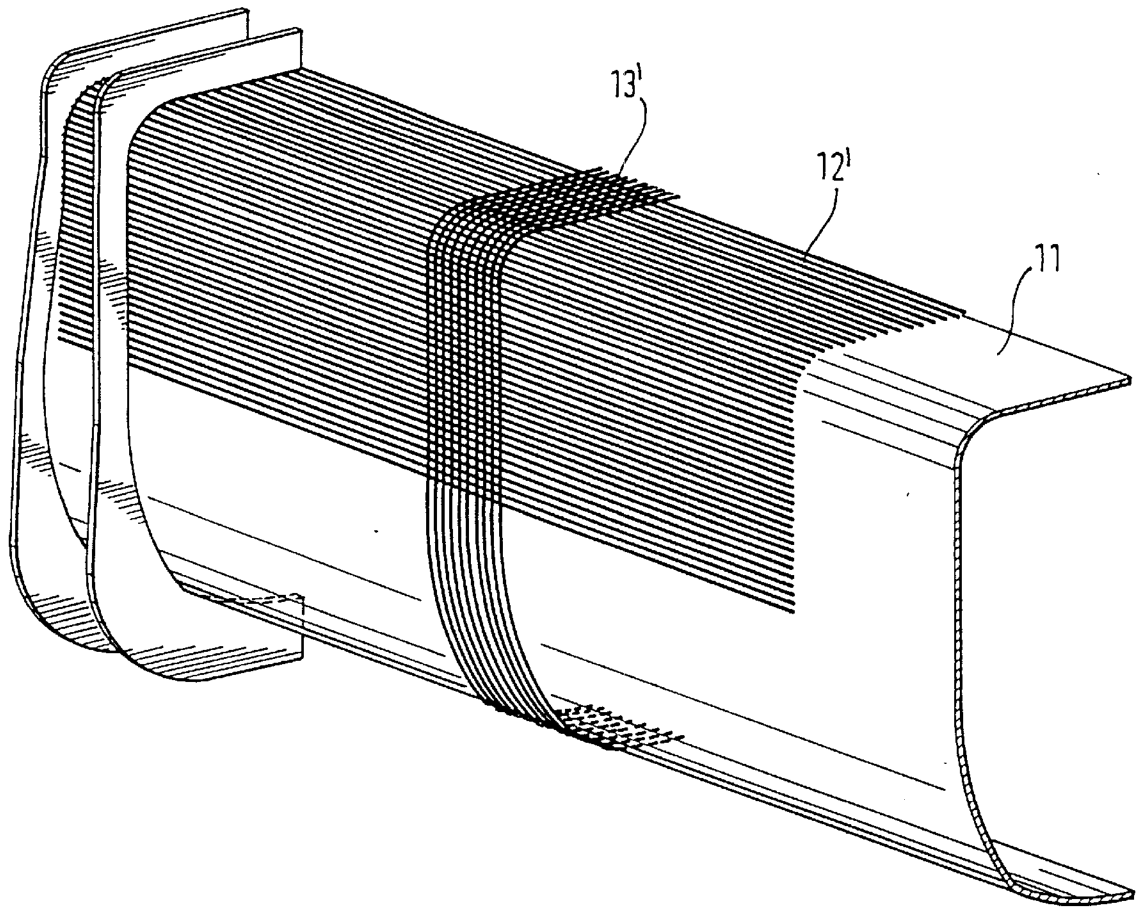
FIG. 7 is a perspective view of the laminar structure of a telescopic part, including rod-type fiber bundles.

Referring now to FIG. 7, there is illustrated a further embodiment of a telescopic part in accordance with the invention in which the steel shell 11 is surrounded by a composite rod-type longitudinal fibers 12', which is in turn covered by a transverse fiber bundle 13' to lock it in place. In such arrangements of firmly wrapped fiber bundles, there is no possibility of the longitudinal fibers being pulled out of place since the longitudinal and the transverse fibers 12' and 13' respectively mutually clamp each other in place. Any heavy tug on the longitudinal fibers 12' results in the contact pressure being increased due to the transverse fibers 13', steel shell 11, longitudinal and transverse fibers 12', 13' forming a friction-locked connection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. In a crane assembly, a section for a jib, the section having a closed, tubular, cross-section, the improvement comprising:

at least the part of the cross-section of the jib section that is subjected in use to tensile forces having a laminated structure including at least one layer of steel and at least one layer of fiber composite adjacent said layer of steel.

2. In a crane assembly, a section for a jib, the section having a closed, tubular, cross-section, the improvement comprising:

at least the part of the cross-section of the jib section that is subjected in use to tensile forces having a laminated structure including at least one layer of steel and at least one layer of fiber composite wherein said at least one steel layer forms an inner layer, and said at least one composite layer forms an outer layer of the section.

3. The crane assembly as set forth in claim 1 wherein said section is a telescoping part of said crane assembly.

4. The crane assembly as set forth in claim 1 wherein said section is a base section of the jib.

5. The crane assembly as set forth in claim 1 wherein said fiber composite includes longitudinal unidirectional fibers in a matrix applied to the layer of steel, and a further wrapping of transverse fibers.

6. The crane assembly as set forth in claim 1 wherein said fiber composite comprises unidirectional fiber matting with fibers extending longitudinally of said section.

7. The crane assembly as set forth in claim 1, wherein said fiber composite is a woven mat comprising primarily fibers extending longitudinally of said section.

8. The crane assembly as set forth in claim 1 wherein said fiber composite consists of longitudinal bundles.

9. The crane assembly as set forth in claim 1 wherein the fiber composite comprises longitudinal fibers non-shiftingly connected to said steel layer.

10. The crane assembly as set forth in claim 1 wherein fixtures are welded to said steel layer, said fixtures holding said fiber composite to the steel layer.

11. The crane assembly as set forth in claim 1 wherein said steel layer comprises holes or recesses by which said fiber composite is held to the steel layer.

12. The crane assembly as set forth in claim 5, further comprising a steel end frame for said section, wherein said longitudinal fibers are molded in the steel end frame.

13. The crane assembly as set forth in claim 12 wherein the ends of said longitudinal and transverse fibers form a unit with said end frame.

14. The crane assembly as set forth in claim 5 wherein said transverse fibers hold and clamp said longitudinal fibers in place.

15. The crane assembly as set forth in claim 5 wherein said longitudinal fibers are mainly located in the zone of the section normally exposed to tensile forces.

16. The crane assembly as set forth in claim 5 wherein said transverse fibers are covered by a protective coating.

17. The crane assembly as set forth in claim 16 wherein said protective coating functions as a sliding surface for cooperating telescoping parts.

18. The crane assembly of claim 1, wherein said layer of composite material is laminated to said layer of steel.

* * * * *